United States Patent [19]

Gandini et al.

[11] Patent Number: 4,961,087
[45] Date of Patent: Oct. 2, 1990

[54] DIAPHRAGM ADJUSTING ARRANGEMENT IN A PHOTOGRAPHIC ENLARGING OR COPYING APPARATUS HAVING SEVERAL LENSES WITH AN ADJUSTABLE DIAPHRAGM

[75] Inventors: Mario Gandini; Franz Obertegger, both of Brixen, Italy

[73] Assignee: Durst Phototechnik GmbH, Brixen, Italy

[21] Appl. No.: 374,236

[22] Filed: Jun. 29, 1989

[30] Foreign Application Priority Data

Jul. 3, 1988 [IT] Italy .................................. 4839 A88

[51] Int. Cl.$^5$ .......................... G03B 27/52; G02B 7/16
[52] U.S. Cl. ........................................ 355/71; 355/55; 350/254
[58] Field of Search ....................... 355/34, 35, 71, 74, 355/55, 56; 350/254

[56] References Cited

U.S. PATENT DOCUMENTS 2,871,776  2/1959  Calamai ............................... 350/234
4,307,940  12/1981  Hagedorn-Olsen .............. 355/55 X

FOREIGN PATENT DOCUMENTS 2088573  6/1982  United Kingdom .

Primary Examiner—L. T. Hix
Assistant Examiner—D. Rutledge
Attorney, Agent, or Firm—Cahill, Sutton & Thomas

[57] ABSTRACT

A diaphragm adjusting arrangement in an enlarging appartus having several lenses with an adjustable diaphragm includes a motor drive for the common adjustment of the diaphragms of all lenses and a device for detecting the adjusting path. By means of the comparison of the actual position of the diaphragms with a given desired position in a control circuit, a control signal is generated for the motor drive to move the diaphragms into the given position.

8 Claims, 3 Drawing Sheets

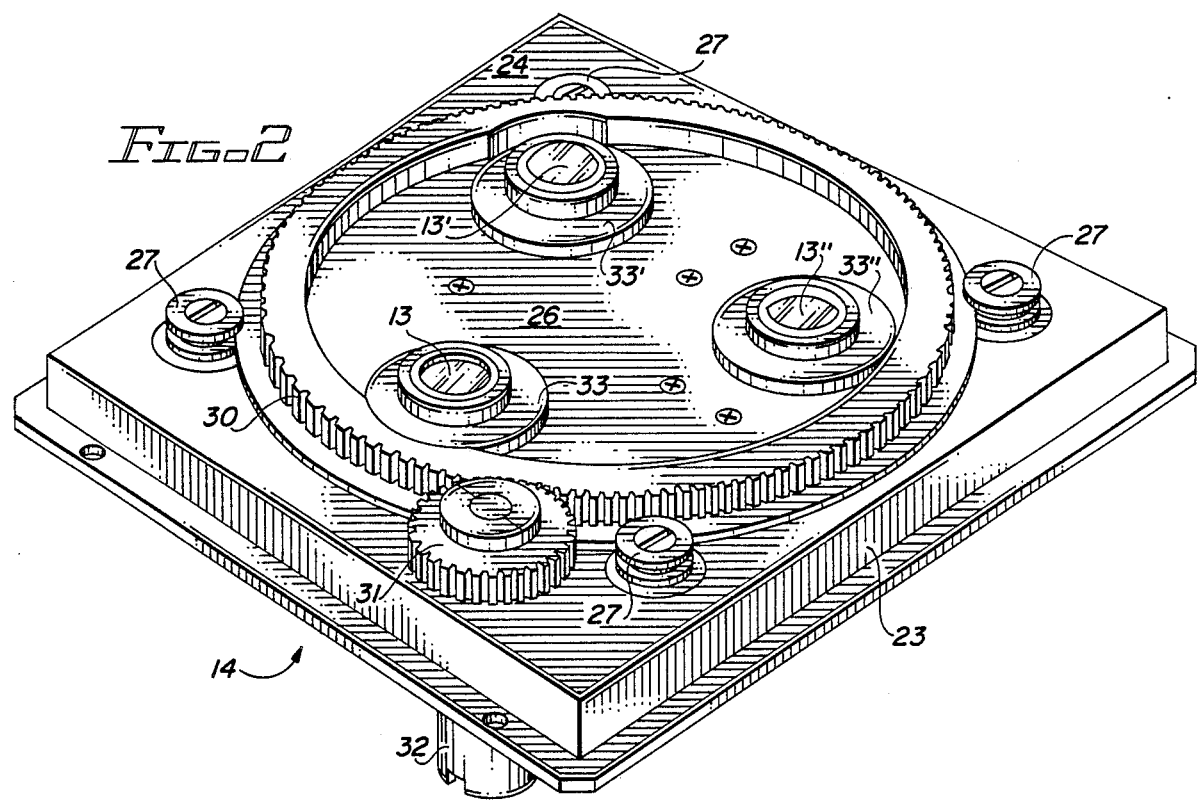
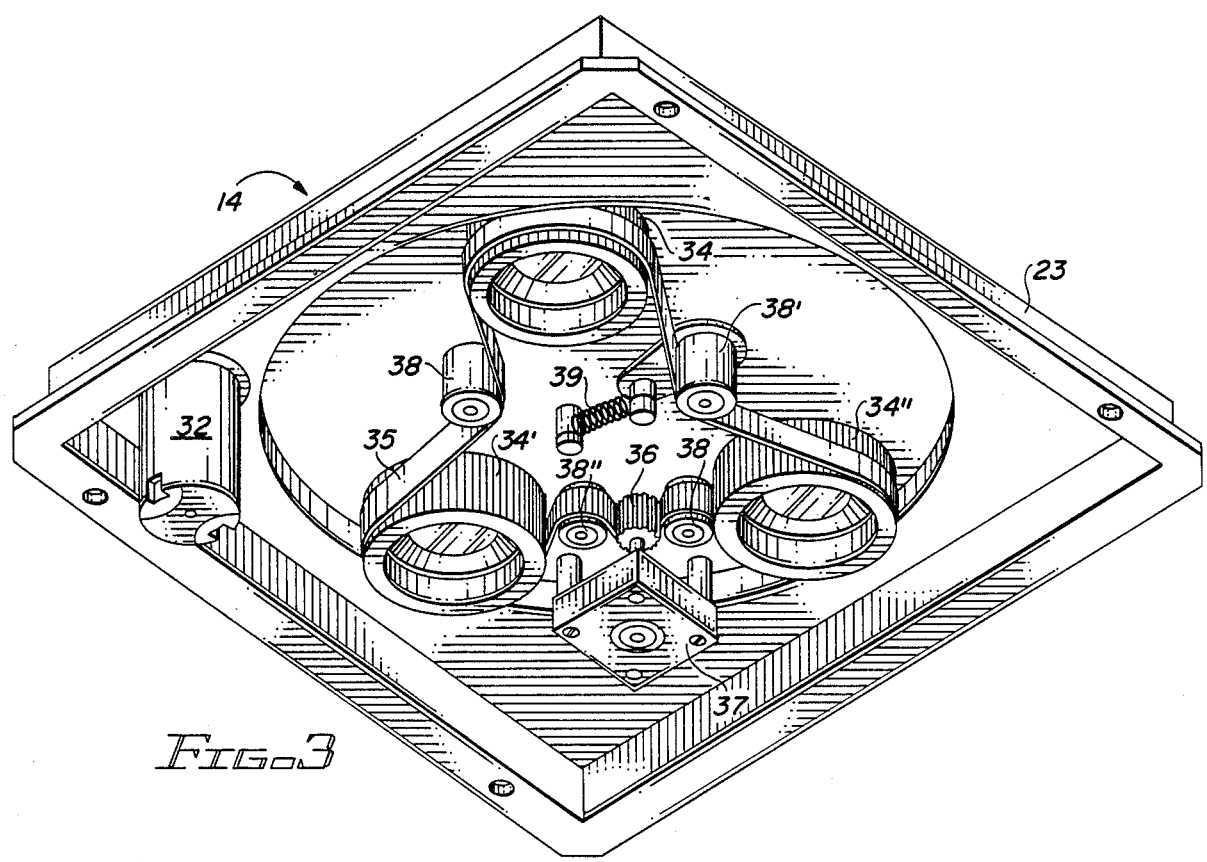

DIAPHRAGM ADJUSTING ARRANGEMENT IN A PHOTOGRAPHIC ENLARGING OR COPYING APPARATUS HAVING SEVERAL LENSES WITH AN ADJUSTABLE DIAPHRAGM

BACKGROUND OF THE INVENTION

Field of the Invention

The invention relates to a diaphragm adjusting arrangement in a photographic enlarging or copying apparatus having several lenses with an adjustable diaphragm 2. Description of the Prior Art Known photographic enlarging apparatuses are designed such that they can be used for producing photographic copies in different formats and from originals to be copied which are also available in different formats In order to obtain the large number of existing formats or the enlarging range required for this purpose, enlarging apparatuses of that type are equipped with several lenses of different focal distances which selectively can be moved into the working position. As a rule, each lens is also provided with an adjustable diaphragm in order to adapt the intensity of the copying light to the specific circumstances of the exposure to be carried out.

In German Patent DE-C 30 45 157, a lens carriage having three lenses is described, in which the diaphragms of the individual lenses, by means of a common adjusting device, can be adjusted manually to given positions which each correspond to a fixed diaphragm number, and the adjusted positions are detected by means of correspondingly arranged microswitches which are electrically connected with one another and with an indicating device. This type of a device is suitable for the adjusting and detecting of only a limited number of diaphragm numbers. It is also unsuitable for inclusion into an automatic control system, as it exists in modern enlarging apparatuses in connection with the exposure control and other measuring and control functions.

The manual adjustment of the lens diaphragms represents a limitation of the automatic operation of the enlarging apparatus with a corresponding prolongation of the processing times, and, in addition, represents a source of errors because of the danger that the diaphragm number on which the determination of the exposure is based does not correspond to the actually adjusted diaphragm number. In fact, without any direct communication between the diaphragm adjustment and the control functions of the enlarging apparatus, it is left to the operator to adjust the diaphragm number on which the determination of the exposure is based or to apply the adjusted diaphragm number correctly to the exposure control.

SUMMARY OF THE INVENTION

It is the object of the invention to provide, in an enlarging apparatus having several lenses with an adjustable diaphragm, a diaphragm adjusting arrangement in which the diaphragm adjustment can be controlled by means of an automatic control and regulating system and which has a simple and space-saving construction, so that it is suitable for a lens carrier of a compact construction.

According to the invention, this object is achieved by means of a diaphragm adjusting arrangement which is characterized in that it has a motor drive for the common adjusting of the diaphragms of all lenses and a device for the detecting of the adjusting path, in the case of which, in a control circuit, by means of the comparison of the actual Position of the diaphragms with a given desired position, a control signal is generated for the drive for moving the diaphragms into the given position.

In a preferred embodiment, the diaphragms of the individual lenses are connected with respect to their movements by means of a toothed belt which reaches around the diaphragm rings and the drive.

A particularly advantageous and space-saving construction is obtained by means of the use of a step motor because the number of steps carried out represents a direct measurement of the adjusting path without the requirement of other devices for detecting the position. In another embodiment, a direct-current motor can be used as the drive in connection with a separate motion pick-up for the adjusting path.

In the preferred embodiment of the invention, the diaphragm adjustment is controlled by a microprocessor system. This provides the possibility of taking into account in the design of the control program the individual regulating characteristics of the diaphragm of each lens.

Additional characteristics and advantages of the invention are found in the subclaims in connection with the following description of a preferred embodiment while referring to the attached drawings.

BRIEF DESCRIPTION OF THE DRAWINGS

FIG. 2 is a perspective view of the lens carrier of the enlarging apparatus of FIG. 1;

FIG. 3 is a sectional view of the lens carrier of FIG. 2;

DETAILED DESCRIPTION OF THE PREFERRED EMBODIMENTS

Figure 1:
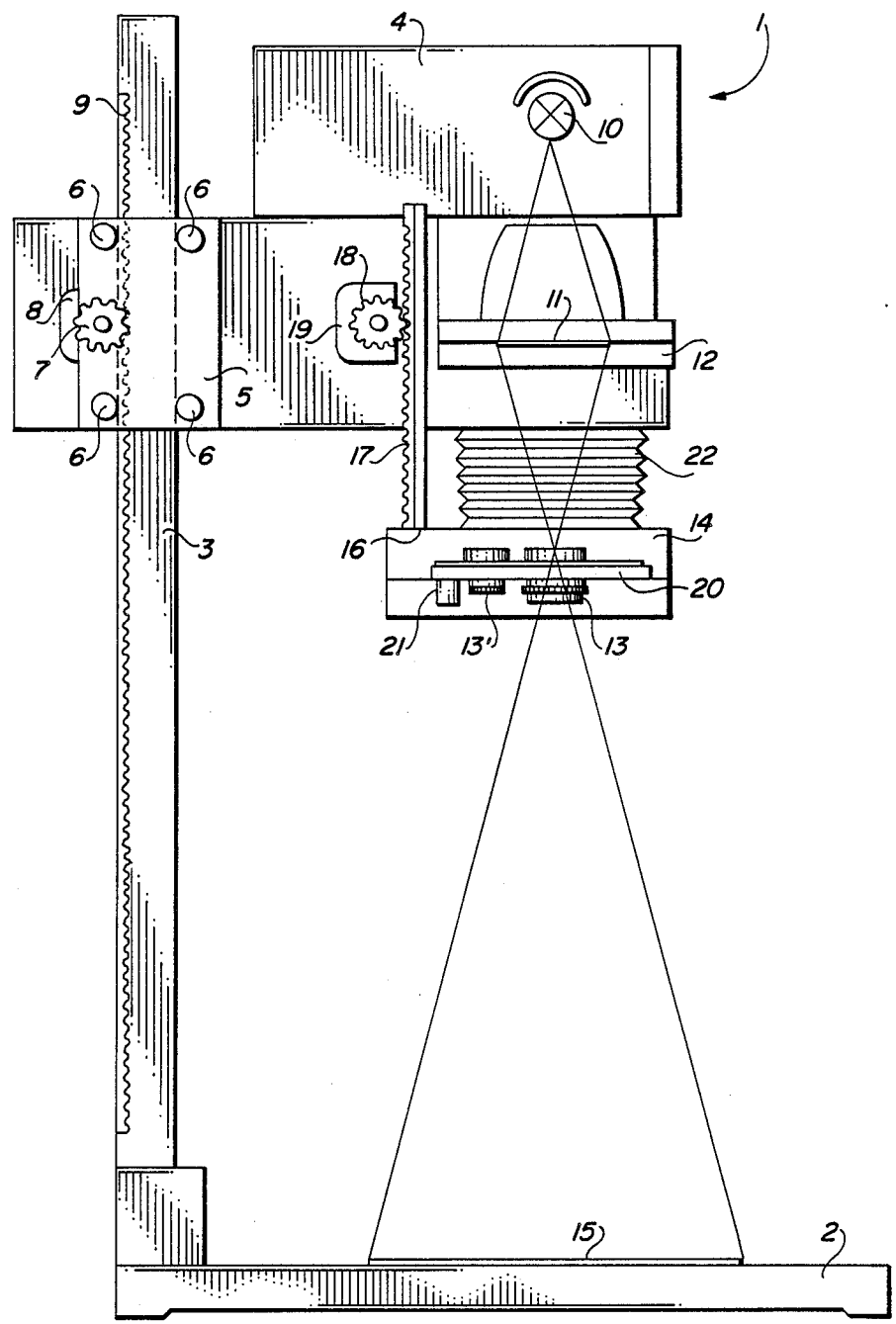
FIG. 1 is a schematic representation of a partially sectional lateral view of a photographic enlarging apparatus.

In FIG. 1, reference number 1 indicates a photographic enlarging apparatus which comprises essentially a baseboard 2, a supporting column 3 and a lighting and projection head 4 which is carried by this supporting column 3. The lighting and projection head 4 is fastened to a holding block 5 which is guided by rollers 6 which rest against the supporting column on opposite sides of the supporting column and are adjustable along the supporting column. A toothed wheel 7 driven by a motor 8 engages with a toothed section 9 of the supporting column. In this manner, the projection head 4 can be motor-driven along the supporting column and can be displaced to a desired height above the baseboard. The projection head 4 comprises a light source 10, the light of which illuminates an original 11 to be copied which is held in a picture platform 12, this original 11 to be copied being imaged by a lens 13 of a lens carrier 14 on the photographic paper 15 arranged on the baseboard. The lens carrier 14 is held at the projection head 4 and can be slid along guiding rods 16 in the direction of the projection axis relative to the plane of the original. For this purpose, a toothed rack 17, which is fixedly mounted on the lens carrier, engages with a toothed wheel 18 fastened at the body of the projection head, this toothed wheel 18 being driven by a motor 19. The lens carrier itself comprises a rotatable plate 20 which carries several lenses 13, 13' and, by means of a motor 21, can be rotated around a center shaft, so that the individual lenses alternately arrive in the working position on the projection axis. The area of the picture platform and the lens carrier is surrounded by a light-proof bellow 22.

It is known that, by changing the distance between the original and the copying plane in connection with the selection of a lens of a suitable focus, the enlarging scale can be adjusted within a wide range, in order to take into account the different formats of the original to be copied as well as of those of the desired copies. The focussing of the projected picture for each selected enlargement takes place by adjusting the lens carrier relative to the original to be copied.

Figure 4:
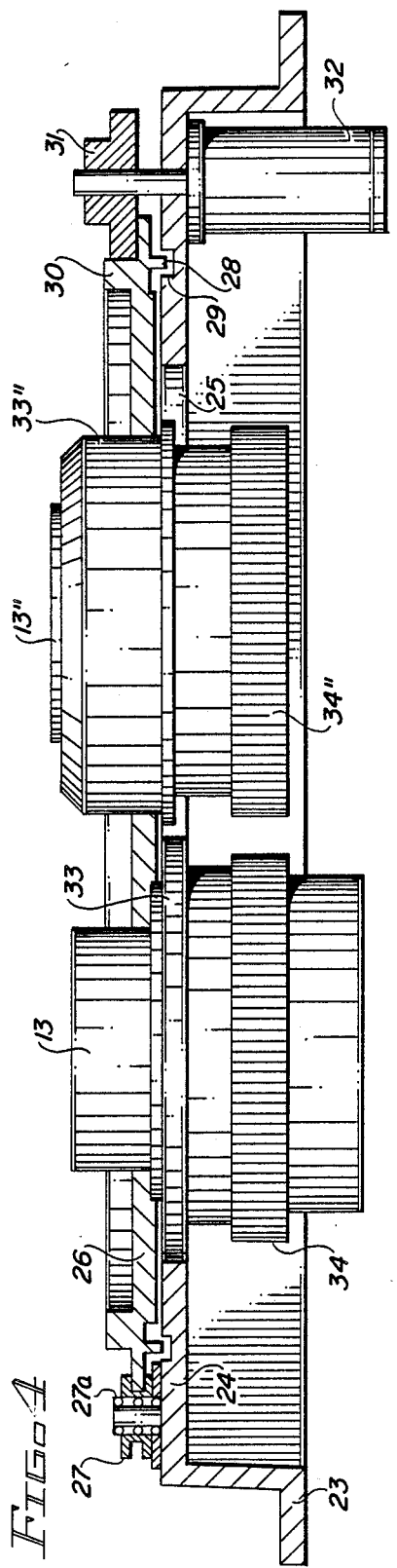
FIG. 4 is a view from below of the lens carrier of FIG. 2.

Referring to FIGS. 2, 3 and 4, the lens carrier 14 will be described in more detail below particularly with respect to the diaphragm adjustment of the inserted lenses. In the Figures, identical parts have the same reference numbers.

The lens carrier consists of an essentially rectangular frame 23 with a floor 24 which has a wide round opening 25. The circular lens carrier plate 26, is held along its circumference by four guide rollers 27 which are rotatably disposed on the floor 24 at a distance from one another, so that the plate 26 can be rotated in a plane which is parallel to the floor while placing itself over the central opening of the floor. As best shown in FIG. 4, the plate 26, on its side, facing the frame, has a ring-shaped projection 28 which extends into and freely engages a corresponding groove 29 of the floor 24. As a result, a light trap is created which prevents light from one side of the lens carrier from reaching the other side. On the opposite side, the lens carrier plate has a concentric toothed ring 30 which, by means of a toothed wheel 31, is coupled with an electric motor 32 fastened to the frame. The lens carrier plate 26 is designed for accommodating three lenses 13, 13', 13'', which are arranged on a circle which is concentric with respect to the axis of rotation and intersects the axis of the projection system. In this fashion, when the plate is rotated, each lens successively arrives in the area of the projection axis.

The lenses 13, 13' and 13'' can be screwed into their own adapter rings 33, 33' and 33', which, in turn, by means of a screwed connection, are fastened on the lens carrier plate. The fastening is designed such that the rotating position of at least two adapter rings can be adjusted, whereby the mutual rotating position of the lenses screwed into the adapter rings can be changed. Each adapter ring is adapted in such a fashion to the lens to be screwed in that, when the lenses are screwed in, the diaphragm rings 34, 34' and 34'', with which the individual lenses are equipped, come to rest in the same plane in the area below the lens carrier plate 26, as shown clearly in FIGS. 3 and 4. At the outer circumference, the diaphragm rings have a toothing and are connected rotatably with one another by means of a toothed belt 35 which runs over a toothed driving wheel 36. The toothed wheel 36 is driven by an electric motor 37 which is fastened on the lens carrier plate and moves along with it. In the sections between the individual diaphragm rings, the toothed belt is guided over guide rollers 38 which are rotatably disposed on fixed bolts projecting out of the lens carrier plate and are arranged such that it is ensured that the toothed belt rests against the diaphragm rings and against the toothed driving wheel 36. In addition, one of the guide rollers 38, by means of a tension spring 39, is prestressed radially in the direction of the center of the lens carrier plate so that it can carry out the function of a belt tightening roller The frame 23 with the lens carrier plate is part of the lens carrier 14 and moves together with the lens carrier 14 in the direction of the projection axis of the lighting system, as indicated above with respect to FIG. 1.

The above description relates to the mechanical construction of the lens carrier in connection with the arrangements for the positioning of the lenses and the adjusting of the diaphragms; the method of operation will now be described by means of the functional diagram shown in FIG. 3, in which the mechanical elements are shown only schematically and have the same reference numbers as in the preceding figures. Thus, the lens carrier plate has the reference number 26; three lenses mounted on the carrier plate have the numbers 13, 13' and 13''; the diaphragm rings of the individual lenses have the reference numbers 34, 34'and 34''; and their adjusting motor has the reference number 37. The line with the reference number 39 schematically shows a dynamic coupling between the diaphragm rings and the driving motor.

The center of the diaphragm control is a microprocessor system 41, comprising a central processor unit 42 and peripheral elements, such as a read-only memory (ROM) 43 as the program memory; a random access memory (RAM) 44 as the data memory; and a clock 45. A data and command input unit 47 as well as the signal output of a position detector 50 are connected with the microprocessor system by means of an input interface 46, the position detector 50 indicating the rotating position of the lens carrier plate 26 with respect to the identification of the lens situated in the working position. In addition, by means of an output interface 48, a motor control unit 49 for the diaphragm adjusting motor 37 as well as the driving motor 32 of the lens carrier plate are connected with the microprocessor system. By means of this arrangement, not only can the lens situated in the working position be identified, but a selected lens can also automatically be brought in the working position by the input of a code assigned to it.

In the preferred embodiment of the diaphragm adjusting arrangement, the adjusting motor 37 is a step motor, and the number of control pulses fed to it determines the extent of the rotating movement of the motor shaft and therefore indirectly represents a measurement of the diaphragm adjusting path. As a result of the fixed assignment of the diaphragm numbers to the rotating position of the diaphragm rings, the counting of the control pulses or of the motor steps, starting from an initial or reference position, continuously supplies the actual diaphragm number. The end stop of the diaphragm rings in the direction of the lowest diaphragm number is preferably selected as the initial position.

The microprocessor system is programmed such that it compares the detected actual diaphragm number with a predetermined given number; from this comparison, microprocessor system determines the number of motor steps which are required for automatically guiding the diaphragm to the given number, and controls the adjusting motor correspondingly. The system is therefore suitable for the automatic adjustment of the diaphragms to a desired number which was previously put in by means of the data input unit 47.

The above described method of operation is based on the assumption that the diaphragm rings of all lenses have the same step; i.e., that identical diaphragm numbers for all lenses correspond to one rotation of the rings by the same angle starting from the initial position. However, within the scope of the invention, a diaphragm adjustment is also possible which differs for the individual lenses. Specifically, by means of the position detector 50 of the lens carrier plate 20, the microprocessor system receives information as to which lens is situated in the working position, and the processor program can take into account an individual adjusting characteristic of each diaphragm. A differing adjustment of the individual diaphragms can also be achieved by the suitable selection of the ratio of transmission between the drive and the respective diaphragm ring, for example, by using diaphragm rings of different diameters.

Figure 5:
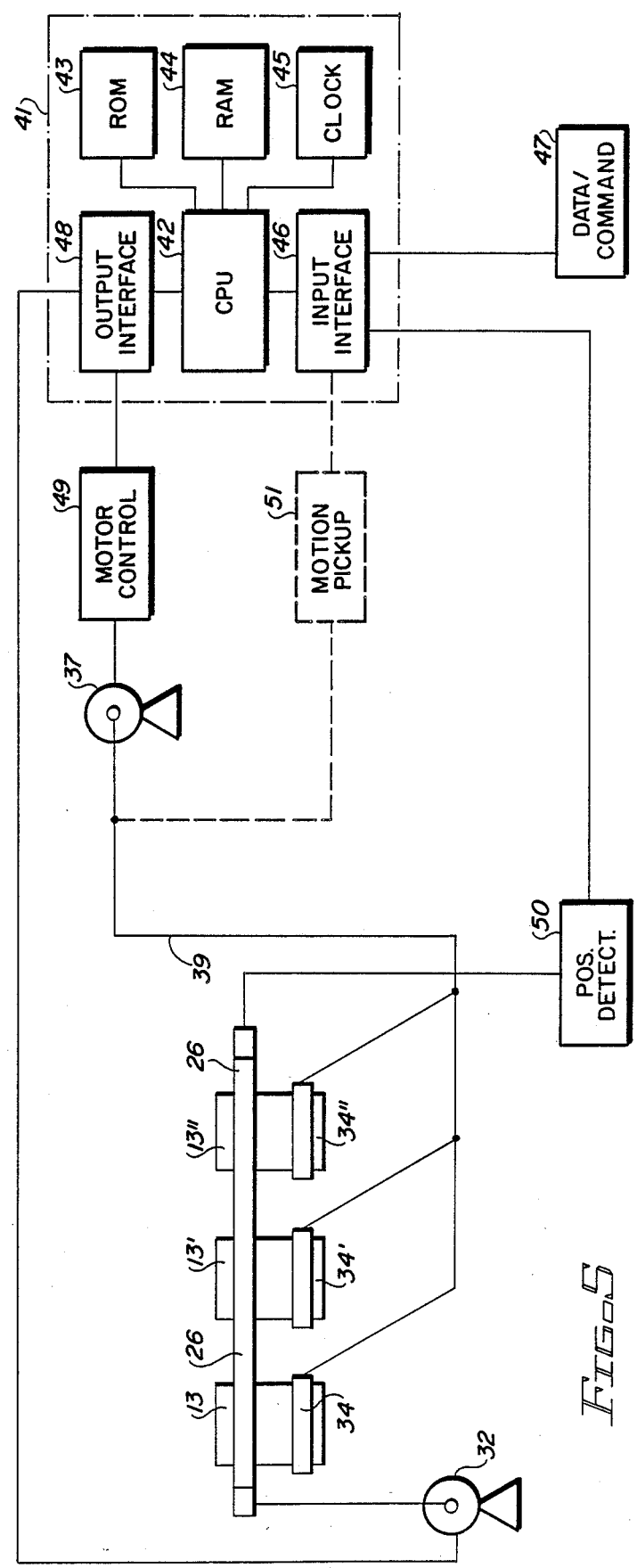
FIG. 5 is a functional diagram of the diaphragm adjusting arrangement.

The use of a step motor is particularly advantageous with respect to a space-saving construction and a compact design of the lens carrier as a whole. However, within the scope of the invention, a direct-current motor may also be used as an adjusting motor, to which a separate device is assigned for the detecting of the diaphragm number by means of the position of the diaphragm rings. This type of a device is shown in FIG. 5 by dashed lines, the reference number 51 indicating a motion pickup which indicates the adjusting path of the diaphragm rings with respect to an initial position and thus furnishes a signal which is representative of the adjusted diaphragm number. As a motion pickup in this type of a device, a potentiometer may, for example, be used, the slip ring of which is coupled with the diaphragm rings. If a fixed voltage is present at the potentiometer resistor, a voltaqe occurs at the potentiometer pickoff which is an analog measuring signal for the diaphragm number and as such is fed to the microprocessor system in digitalized form.

For practical reasons, it may be desirable to limit the diaphragm adjustment to a number of discrete diaphragm numbers, such as the number 5.6 - 8- 11 - 16. In this case, the microprocessor system is prepared in such a manner that only the input of these numbers is accepted.

Advantageously, the microprocessor system also takes over control and regulating functions in connection with the determination of exposure values as well as the control of the exposure sequence, as it is known from modern photographic copying apparatuses and therefore does not have to be described in detail.

We claim:

1. A diaphragm adjusting arrangement in a photographic enlarging or copying apparatus having a plurality of lenses each having an adjustable diaphragm, said diaphragm adjusting arrangement comprising in combination:
   a. a motor drive coupled to the diaphragms of the plurality of lenses for commonly adjusting the diaphragms of all of the plurality of lenses;
   b. detection means for detecting the actual position of a selected diaphragm, said detection means continuously monitoring the actual position of the selected diaphragm relative to an initial position thereof;
   c. input means for receiving data from an operator representing a desired diaphragm position; and
   d. a control circuit coupled to said detection means and to said input means for comparing the actual position of a selected diaphragm to the desired diaphragm position, said control circuit generating a control signal for controlling said motor drive for moving the selected diaphragm into the desired position.

2. A diaphragm adjusting arrangement in a photographic enlarging or copying apparatus having a plurality of lenses each having an adjustable diaphragm, said diaphragm adjusting arrangement comprising in combination:
   a. a motor drive coupled to the diaphragms of the plurality of lenses for commonly adjusting the diaphragms of all of the plurality of lenses;
   b. detection means for detecting the actual position of a selected diaphragm;
   c. input means for receiving data from an operator representing a desired diaphragm position;
   d. a control circuit coupled to said detection means and to said input means for comparing the actual position of a selected diaphragm to the desired diaphragm position, said control circuit generating a control signal for controlling said motor drive for moving the selected diaphragm into the desired position;
   e. the adjusting diaphragm of each of the plurality of lenses including a toothed diaphragm ring; and
   f. said motor drive including an adjusting motor having a drive shaft, said motor drive further including a toothed belt engaged with the drive shaft of the adjusting motor and engaged with the toothed diaphragm ring of each of the plurality of lenses for commonly rotating the diaphragm of each of the lenses.

3. A diaphragm adjusting arrangement in a photographic enlarging or copying apparatus having a plurality of lenses each having an adjustable diaphragm, said diaphragm adjusting arrangement comprising in combination:
   a. a step motor commonly coupled to the diaphragms of the plurality of lenses for commonly rotating and adjusting the diaphragms of all of the plurality of lenses, said step motor being responsive to the receipt of control pulses for rotatably advancing in steps;
   b. detection means for detecting the actual position of a selected diaphragm, said detection means counting the number of control pulses received by said step motor;
   c. input means for receiving data from an operator representing a desired diaphragm position; and
   d. a control circuit coupled to said detection means and to said input means for comparing the actual position of a selected diaphragm to the desired diaphragm position, said control circuit generating control pulses for controlling said step motor for moving the selected diaphragm into the desired position.

4. A diaphragm adjusting arrangement in a photographic enlarging or copying apparatus having a plurality of lenses each having an adjustable diaphragm, said diaphragm adjusting arrangement comprising in combination:
   a. a direct-current motor commonly coupled to the diaphragms of the plurality of lenses for commonly rotating and adjusting the diaphragms of all of the plurality of lenses;
   b. detection means for detecting the actual position of a selected diaphragm, said detection means including a motion pickup device coupled to said diaphragms for detecting the degree to which said diaphragms are moved from an initial position;

c. input means for receiving data from an operator representing a desired diaphragm position; and d. a control circuit coupled to said detection means and to said input means for comparing the actual position of a selected diaphragm to the desired diaphragm position, said control circuit generating a control signal for controlling said directcurrent motor for moving the selected diaphragm into the desired position.

5. The diaphragm adjusting arrangement described by claim 11 wherein said motion pickup device includes a potentiometer rotatably coupled to said diaphragms for producing a measuring signal corresponding to the position of said diaphragms.

6. A diaphragm adjusting arrangement in a photographic enlarging or copying apparatus having a plurality of lenses each having an adjustable diaphragm, said diaphragm adjusting arrangement comprising in combination:

a. a motor drive coupled to the diaphragms of the plurality of lenses for commonly adjusting the diaphragms of all of the plurality of lenses;

b. detection means for detecting the actual position of a selected diaphragm;

c. input means for receiving data from an operator representing a desired diaphragm position;

d. a control circuit including a microprocessor system coupled to said detection means and to said input means for comparing the actual position of a selected diaphragm to the desired diaphragm position, said control circuit generating a control signal for controlling said motor drive for moving the selected diaphragm into the desired position;

e. lens identification means coupled to said plurality of lenses for identifying a lens situated in a working position of the photographic enlarging or copying apparatus; and f. said microprocessor system being coupled to said lens identification means and being responsive thereto to individually control the diaphragm of each of the plurality of lenses in accordance with an individual adjusting characteristic for each such lens as determined by the lens situated in the working position.

7. A diaphragm adjusting arrangement in a photographic enlarging or copying apparatus having a plurality of lenses each having an adjustable diaphragm, said diaphragm adjusting arrangement comprising in combination:

a. a motor drive coupled to the diaphragms of the plurality of lenses for commonly adjusting the diaphragms of all of the plurality of lenses;

b. detection means for detecting the actual position of a selected diaphragm;

c. input means for receiving data from an operator representing a desired diaphragm position;

d. a control circuit coupled to said detection means and to said input means for comparing the actual position of a selected diaphragm to the desired diaphragm position, said control circuit generating a control signal for controlling said motor drive for moving the selected diaphragm into the desired position;

e. lens identification means for identifying a lens situated in a working position of the photographic enlarging or copying apparatus; and f. said motor drive having different ratios of transmission with respect to the individual diaphragms.

8. The diaphragm adjusting arrangement described by claim 7 wherein the adjustable diaphragm of each of the plurality of lenses includes a diaphragm ring, and wherein said motor drive includes an adjusting motor having a drive shaft, said motor drive further including drive means engaged with the drive shaft of the adjusting motor and engaged with the diaphragm ring of each of the plurality lenses for commonly rotating the diaphragm of each of the lenses, at least two of said diaphragm rings being of different diameters from each other to cause different ratios of transmission between said motor drive and the diaphragms associated with said at least two diaphragm rings.

* * * * *